United States Patent [19]
Clark et al.

[11] Patent Number: 5,848,859
[45] Date of Patent: Dec. 15, 1998

[54] SELF NORMALIZING DRILL HEAD

[75] Inventors: Gregory L. Clark, Issaquah; David A. Yousko, Renton, both of Wash.

[73] Assignee: The Boeing Company, Seattle, Wash.

[21] Appl. No.: 785,821

[22] Filed: Jan. 8, 1997

[51] Int. Cl.⁶ .............................. B23B 35/00; B23B 41/00
[52] U.S. Cl. .............................. 408/1 R; 408/13; 408/67; 408/95; 901/41
[58] Field of Search .............................. 408/1 R, 13, 67, 408/95, 97, 236; 901/41, 45

[56] References Cited

U.S. PATENT DOCUMENTS

| | | |
|---|---|---|
| 1,630,528 | 5/1927 | Doyle . |
| 3,145,622 | 8/1964 | Rust et al. . |
| 3,572,181 | 3/1971 | Schlegel . |
| 3,617,141 | 11/1971 | Sullivan . |
| 3,973,859 | 8/1976 | Huber et al. . |
| 4,108,566 | 8/1978 | Jones . |
| 4,179,231 | 12/1979 | Hadden . |
| 4,332,066 | 6/1982 | Hailey et al. . |
| 4,338,723 | 7/1982 | Benjamin . |
| 4,386,532 | 6/1983 | Benjamin . |
| 4,409,736 | 10/1983 | Selzter . |
| 4,485,453 | 11/1984 | Taylor . |
| 4,611,377 | 9/1986 | McCormick et al. . |
| 4,613,262 | 9/1986 | Woods . |
| 4,662,556 | 5/1987 | Gidlund . |
| 4,740,119 | 4/1988 | Lierz . |
| 4,752,160 | 6/1988 | Murray et al. . |
| 4,778,317 | 10/1988 | Earle, III et al. . |
| 4,820,092 | 4/1989 | Mueller et al. . |
| 4,848,757 | 7/1989 | De Fazio . |
| 4,999,896 | 3/1991 | Mangus et al. .............................. 408/95 |
| 5,349,337 | 9/1994 | McCormick . |

FOREIGN PATENT DOCUMENTS

1960440  6/1971  Germany .

*Primary Examiner*—Daniel W. Howell
*Attorney, Agent, or Firm*—J. Michael Neary

[57] ABSTRACT

An improved drilling device for drilling normal holes in a workpiece surface is carried and positioned by an automatic control arm. The improved drilling device includes a compliant drill head generally comprising a drill housing and a pressure foot. The pressure foot for contacting the workpiece surface is connected to the drill housing at a universally swiveling joint. The drill housing encloses a drill drive means that advances and rotates a drill tool about a drill axis. Both the pressure foot and the drill housing have axial chambers and holes for permitting the drill tool to advance to the workpiece surface. Linear gauges mounted to the drill housing probe the orientation of the pressure foot relative to the drill housing. The linear gauges provide data to the automatic control arm so that when the pressure foot contacts a portion of the workpiece surface that is not normal to the drill axis and the pressure foot swivels relative to the drill housing as the pressure foot orients normal to the workpiece surface, the control arm can realign the drill housing with the pressure foot so that the drill axis is normal to the work piece surface and so that the drill tool can be advanced and rotated toward and through the workpiece surface there by drilling a normal hole in the workpiece surface.

20 Claims, 7 Drawing Sheets

SELF NORMALIZING DRILL HEAD

This invention pertains to drilling devices, and more particularly to an improved drilling device having a drill head which has a compliant pressure foot that lies flat against a workpiece surface at a drill point and which generates signals which a controller of a numerically controlled automated positioning apparatus on which the drilling device is mounted can use to normalize the drilling axis of the drilling device with the workpiece surface for drilling a hole that is substantially normal to the workpiece surface.

BACKGROUND OF THE INVENTION

Many thousands of fastener holes are drilled during assembly of an aircraft, and it is often important that these fastener holes be drilled normal to the surface at each drill point and have very uniform and exact countersink features. This is particularly true for the exterior surfaces of aircraft which are contoured and have flush countersunk fasteners. Often, such holes must be drilled into an aluminum workpiece having a soft aluminum clad finish that can easily be marred during either manual or automated drilling. Further, it is often necessary to drill holes near the edge of a workpiece.

Skilled aircraft workers can, with proper tools, adjust to surface variations and manually drill acceptable fastener holes with reasonable consistency, but manual drilling introduces another set of variations, such as the pressing force exerted by the worker, dwell time on reaching the end of the drill stroke, alignment of the pressing force vector with the drilling jig centerline, and a host of other variables introduced by the individual characteristics of the workers which influence the hole quality in unpredictable ways.

Because typically so many holes must be drilled in aircraft components and assemblies, and because drilling these holes manually is difficult, labor intensive, and subject to individual process variations, automated drilling devices are often employed to drill these holes. Modern automated drilling systems use data sets based on an engineering part definition defining a workpiece surface, drill point locations and drill vectors that are normal to the workpiece surface at each of the drill point locations. Unfortunately, however, the actual workpiece surface does not always correspond exactly to the nominal orientation in the engineering part definition. Even if the actual workpiece surface orientation deviates only slightly from the engineering definition, an automated drilling process will not consistently produce fastener holes that are normal to the workpiece surface at each location and that have the exact and uniform counter sink features required for the optimum aerodynamic performance of the aircraft.

Flexible airplane fuselage and other structures tend to deflect to some extent when force from the drill head is applied. Force is exerted by the drill feed motor feeding the drill into the workpiece, and is exerted by the pressure foot to hold the drill head in place on the workpiece and to press together the stack of parts to be drilled and fastened together to prevent interlaminar burrs from intruding between the parts in the stack-up. Deflection of the supporting structure under the workpiece can be uneven, causing the surface of the workpiece to assume a slightly tilted orientation relative to its original orientation on the undeflected supporting structure. If the hole were drilled in the workpiece in this tilted orientation, the axis of resulting hole would deviate from the desired normal orientation when the press-up force of the drilling head is withdrawn and the supporting structure recovers elastically from its deflected position.

With the advent of digital definition in the aircraft industry, there is a serious and growing need for drilling devices and processes that can adjust to deflections and other non-nominal surface orientations in workpieces and still perform drilling operations with optimal precision. Here, the particular problem is to devise an automated drilling apparatus and method that uses an engineering data set containing hole locations and drill vectors but that also adjusts the drill vector in response to local workpiece surface conditions found at each drill point location on a workpiece surface so that a normal hole can be drilled into a workpiece surface even at an edge of a workpiece and even into a workpiece having a delicate surface without marring the surface surrounding the hole.

Thus, there has long been a need in industry, and in the airframe manufacturing business in particular, for a method and apparatus for drilling holes normal to the surface of a workpiece, particularly a flexible, contoured workpiece and a workpiece that has openings and edges around which holes must be drilled normal to the surface.

SUMMARY OF THE INVENTION

Accordingly, it is an object of this invention to provide an improved apparatus and method for drilling holes in a workpiece normal to the workpiece surface. Another object of this invention is to provide a drilling device that has a compliant portion that contacts and lies flush with a workpiece surface at a selected drill point, measures deviation between the normal vector to the workpiece at the drill point and the drill axis, and sends signals corresponding to the deviation to a controller that realigns the drilling device so that its axis coincides with the normal vector, thereby aligning the drilling device to drill a normal hole in the workpiece surface. Still another object of this invention is to provide a drilling method and apparatus for drilling normal holes in a delicate workpiece surface without marring the surface surrounding the hole. Yet another object of this invention is to provide a drilling method and apparatus for drilling normal holes in a workpiece surface near the edge of that surface.

These and other objects of the invention are attained in an improved drilling method and apparatus for drilling normal holes in a workpiece. The drilling device has a mechanical and power coupling adapter that can be gripped by an automatic control arm by which it carries the drilling device and positions it over the desired drill point, and through which power is supplied to the drilling device. A compliant drill head on the drilling device includes a pressure foot having a lower surface that contacts the workpiece on a contact footprint closely surrounding the drill point, and a spherical upper surface that is defined by a sphere having its center at the drill point. The spherical upper surface of the pressure foot is in sliding contact with a mating spherical surface of a mounting socket on the drilling device to which the pressure foot is held by four helical springs, forming a universally swiveling joint of the pressure foot on the drilling device. A drill spindle of the drilling device extends through a central passage in the pressure foot, including a cylindrical hole in the upper surface, a cylindrical hole in the center of the lower surface and a central chamber communicating between them. A measuring ring projects radially about the pressure foot and is engaged by measuring probes that detect the tilt angle of the measuring ring and pressure foot relative to the drill axis. The probes generate signals that are read by the controller of the automatic control arm for tilting the arm about the drill point to align the drill axis with the normal vector at the drill point. Side ports and ducts in the pressure foot convey an air stream through the central chamber of the pressure foot for removing drilling chips. The lower surface of the pressure foot has a small area so that it can detect local surface deviations in the workpiece closely surrounding the drill point. The small pressure foot also makes it possible to drill holes closely adjacent other structure without interference from the other structure, and also near an edge of an opening.

BRIEF DESCRIPTION OF THE DRAWINGS

The invention and its many attendant objects and advantages will become better understood upon reading the following detailed description of the preferred embodiment in conjunction with the following drawings, wherein.

DETAILED DESCRIPTION OF THE PREFERRED EMBODIMENT

Figure 1:
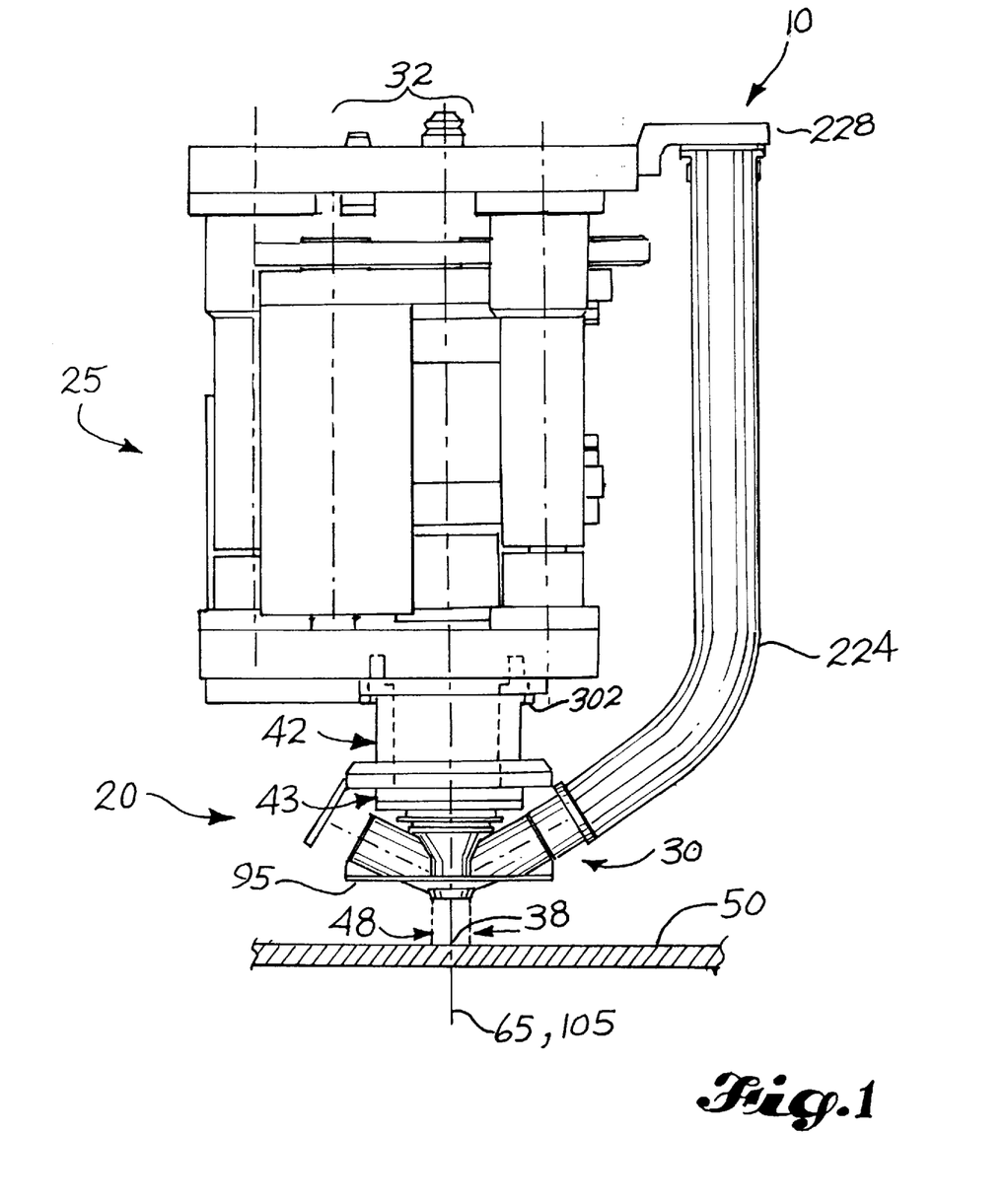
FIG. 1 is an elevation view of an improved drilling device in accordance with this invention.
Figure 2:
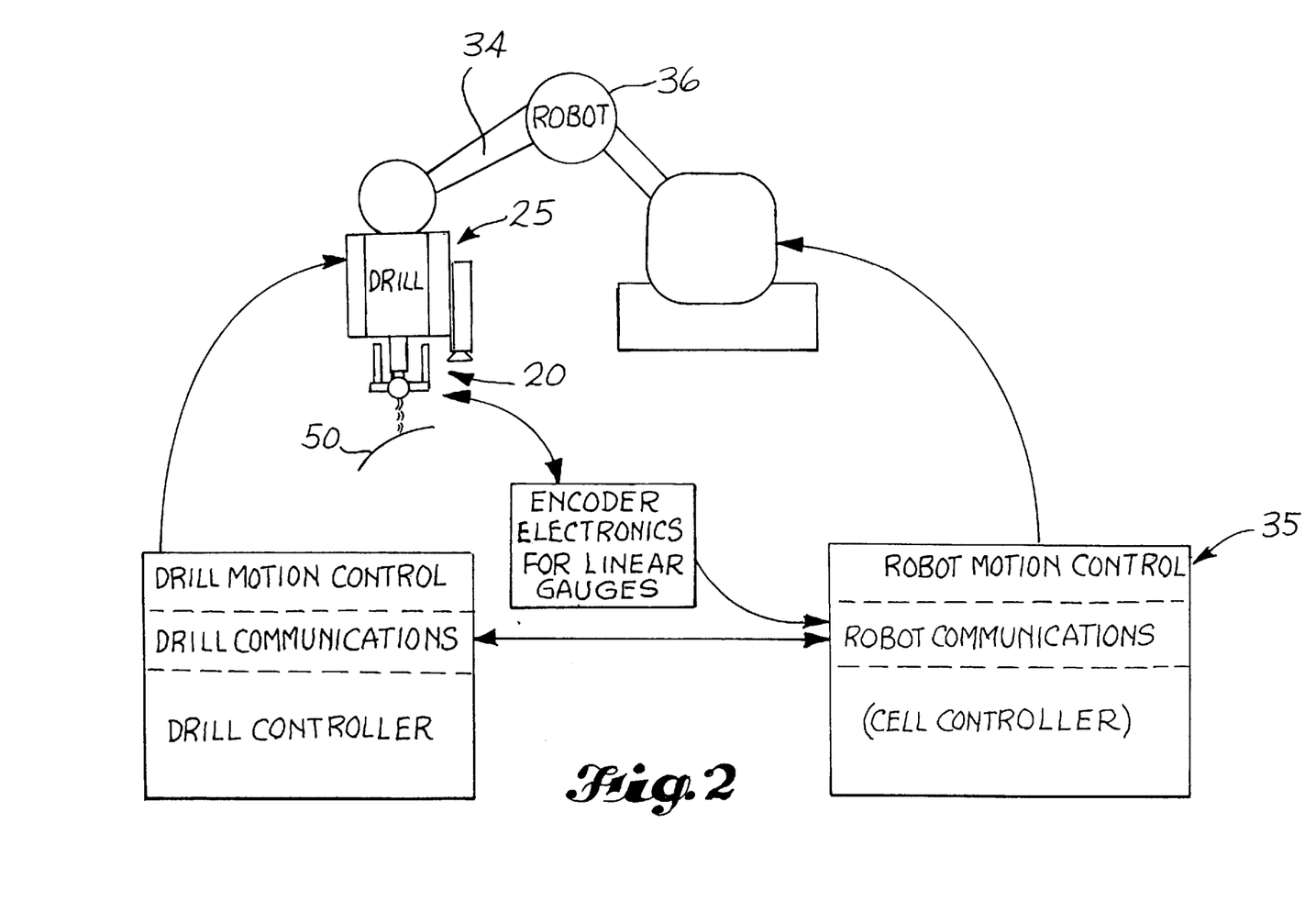
FIG. 2 is a schematic diagram of a system architecture in which the device shown in FIG. 1 operates.

Turning now to the drawings, wherein like reference numerals identify identical or corresponding elements, and more particularly to FIG. 1 thereof, an improved drilling system 10 is shown having a compliant drill head 20 attached to a conventional drilling device 25, a vacuum system 30, and a mechanical, vacuum and power coupling 32 for connection to an automatic control arm 34 under control of a controller 35 of a robot 36, shown in FIG. 2, for moving and positioning the drilling device 25. A suitable drilling device 25 is a CNC Aerodrill sold by EOA Systems, Inc. in Dallas, Tex., operation of which is described in U.S. Pat. No. 5,349,337. A suitable coupling for the Aerodrill is shown in more detail in U.S. Pat. No. 4,611,377. The disclosures of both of these two patents are incorporated herein by reference. The control arm 34 could also be the arm of any of numerous existing automated apparatus, such as a gantry machine tool shown in FIG. 1 of Provisional Application 60/013,986 filed by Munk and Strand on Mar. 22, 1996, for moving and orienting a drilling device to a desired location on a workpiece, and for clamping the parts together while drilling. Ideally, such a gantry machine tool is modified using the control software commonly used in a robot to enable the robot arm to tilt the drilling device 25 about the point at which the drill bit contacts the workpiece, known as the drill point 38, shown in FIGS. 3 and 4. This capability will enable the automated positioning apparatus to tilt the drilling device 25 to normalize its axis to the plane of the workpiece at the drill point 38. Other forms of such automated apparatus are well known to those skilled in the art, such as the vertical tower robot and the like, often known as "5-axis machine tools". Such apparatus is considered part of the present invention in combination with and integrated into the drilling system by mechanical connection and data transmission from the compliant drill head 20, as illustrated by the schematic of FIG. 2, as discussed in more detail below.

The compliant drill head 20 has a pressure foot 40 which contacts the workpiece and swivels to lie flat against a small area 48 of the workpiece surface 50 closely surrounding the drill point 38 and sense its orientation relative to the drill axis. Sensors on the drill head 20 detect the orientation of the pressure foot 40 and provide orientation signals to the controller 35 of the robot or 5-axis machine which it uses to tilt the drilling device 25 about the drill point 38 on a vector that will orient the drilling axis of the drill head 20 normal to the workpiece surface 50 at the drill point 38. The compliant drill head 20, as shown in FIGS. 3–7, has a pressure foot 40 swivelably mounted on an adapter mount rigidly mounted to the drilling device 25. The adapter mount includes an adapter casing 42 and a socket mount 43 releasably held in the adapter casing 42. The adapter casing 42 surrounds a drill bit 44 chucked in the end of a drill spindle 46 with a quick change collet or chuck 47. The pressure foot 40 is secured to the socket mount 43 by a swiveling connection that enables the pressure foot to swivel about the drill point 38. The drill spindle 46 is supported for axial movement on a drill axis 65 along which it advances and rotates the drill bit 44.

Figure 3:
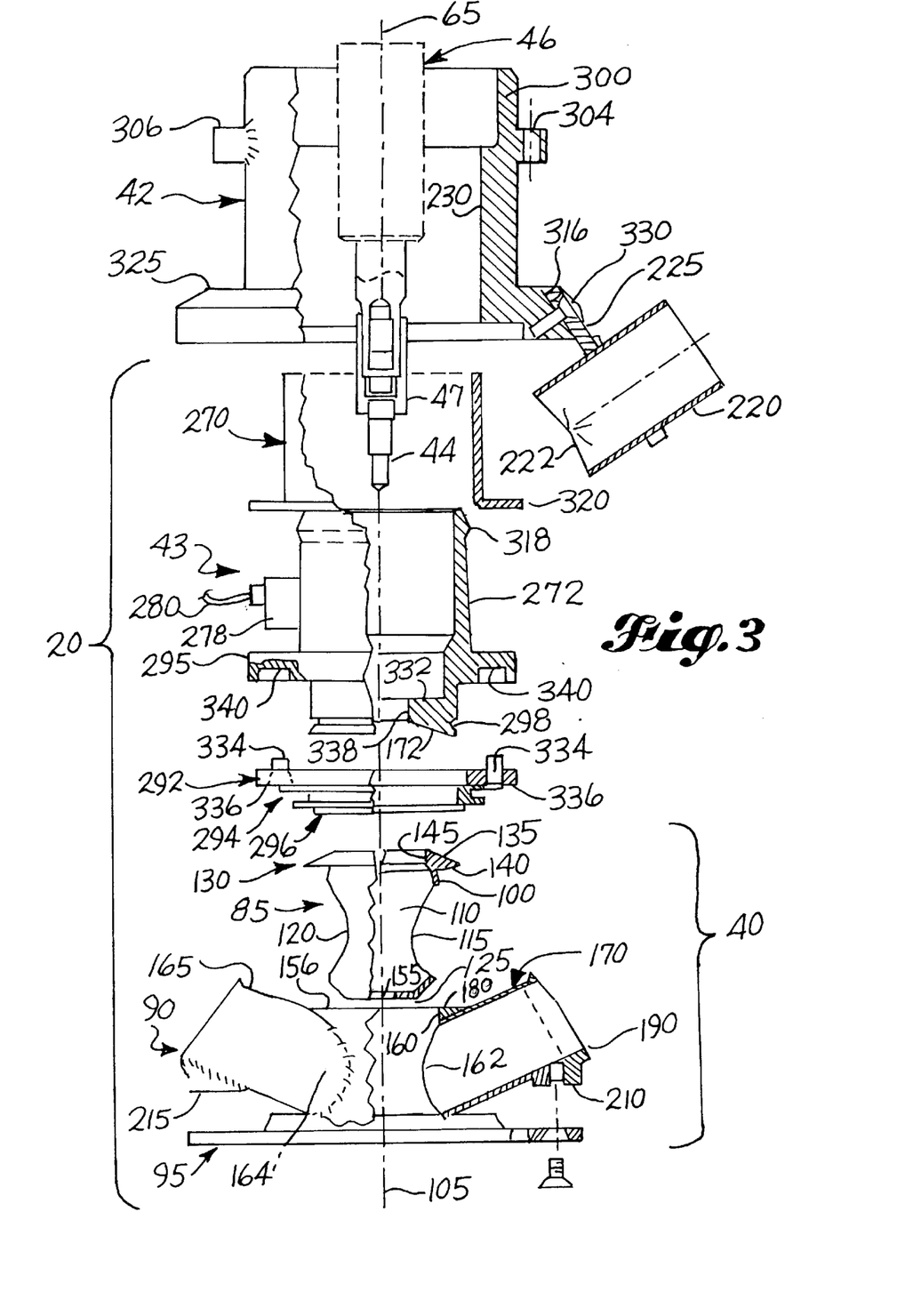
FIG. 3 is an exploded section view of the compliant drill head taken at a first plane.
Figure 7:
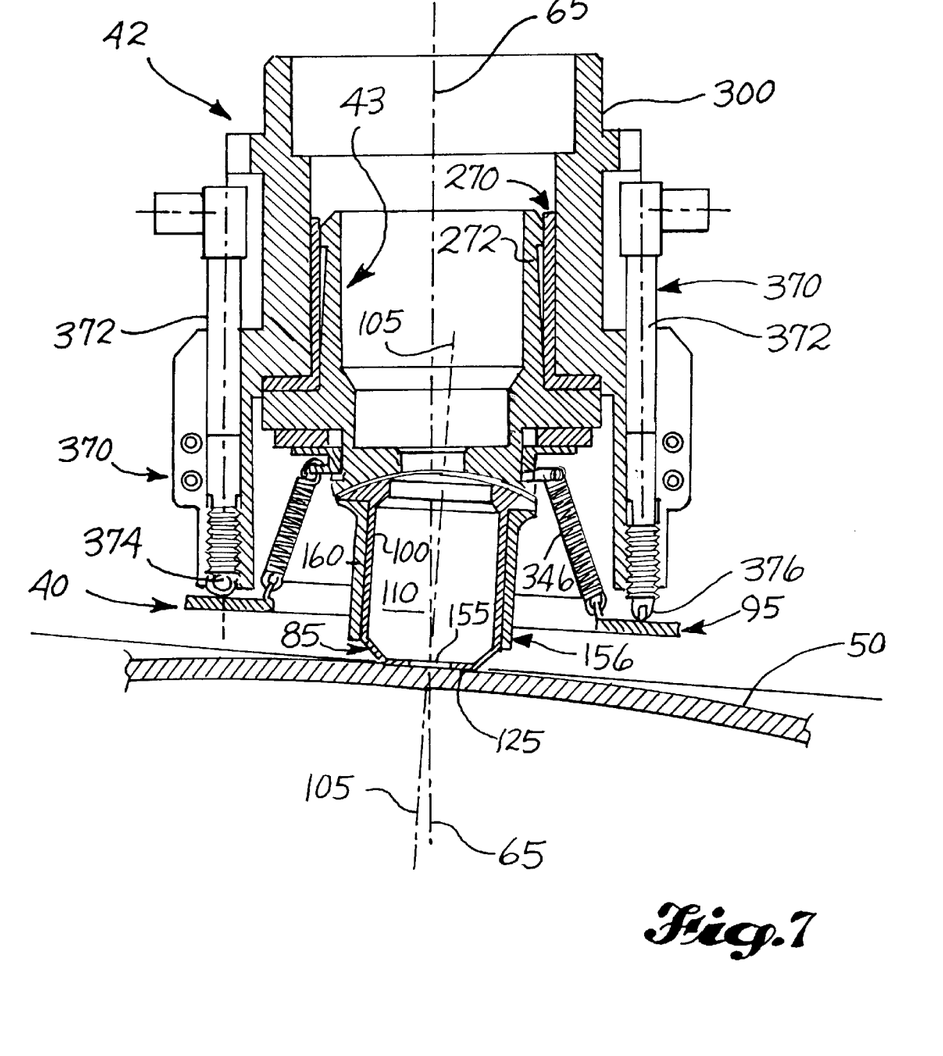
FIG. 7 is a section view of the compliant drill head taken at the second plane wherein the compliant drill head is in contact with a workpiece surface.

The pressure foot 40, shown in greater detail in FIG. 3, includes a foot core 85, a vacuum housing 90 and a measuring ring 95. The foot core 85 has a cylindrical body with a cylindrical wall 100 centered about a pressure foot axis 105 and enclosing a central chamber 110. Two diametrically opposed side ports 115 and 120 in the cylindrical wall 100 provide openings for connection to the vacuum system 30 for suction removal of drill chips. The lower end of the foot core 85 is a highly polished, substantially flat contact surface 125, beveled up at its circular outside peripheral edge, and the upper end is formed in a cap 130 with a spherical upper surface 135 and a flat under surface 140 that extends radially from the cylindrical wall 100 to the outer peripheral edge of the cap 130. The spherical upper surface 135 is defined by a sphere centered at a center point 155 that lies at the intersection of pressure foot axis 105 and the lower surface of flat base 125, so the center point 155 always lies on the drill axis 65. During drilling, the pressure foot axis 105 and the drill axis 65 intersect at the center point 155, which also coincides with the drill point 38, as shown in FIG. 7.

A cylindrical axial hole 145 communicates between spherical upper surface 135 of the cap 130 and the central chamber 110. A smaller axial hole 150 communicates between the central chamber 110 and the lower surface of the substantially flat contact surface 125. The axial hole 145 has a diameter that is substantially larger than the diameter of the quick change collet 47 so that the cap 130 of the foot core 85 will not interfere with the collet 47 extending through the hole 145 when the foot core 85 tilts as a result of the contact surface 125 contacting and lying flat against the workpiece surface 50.

Figure 4:
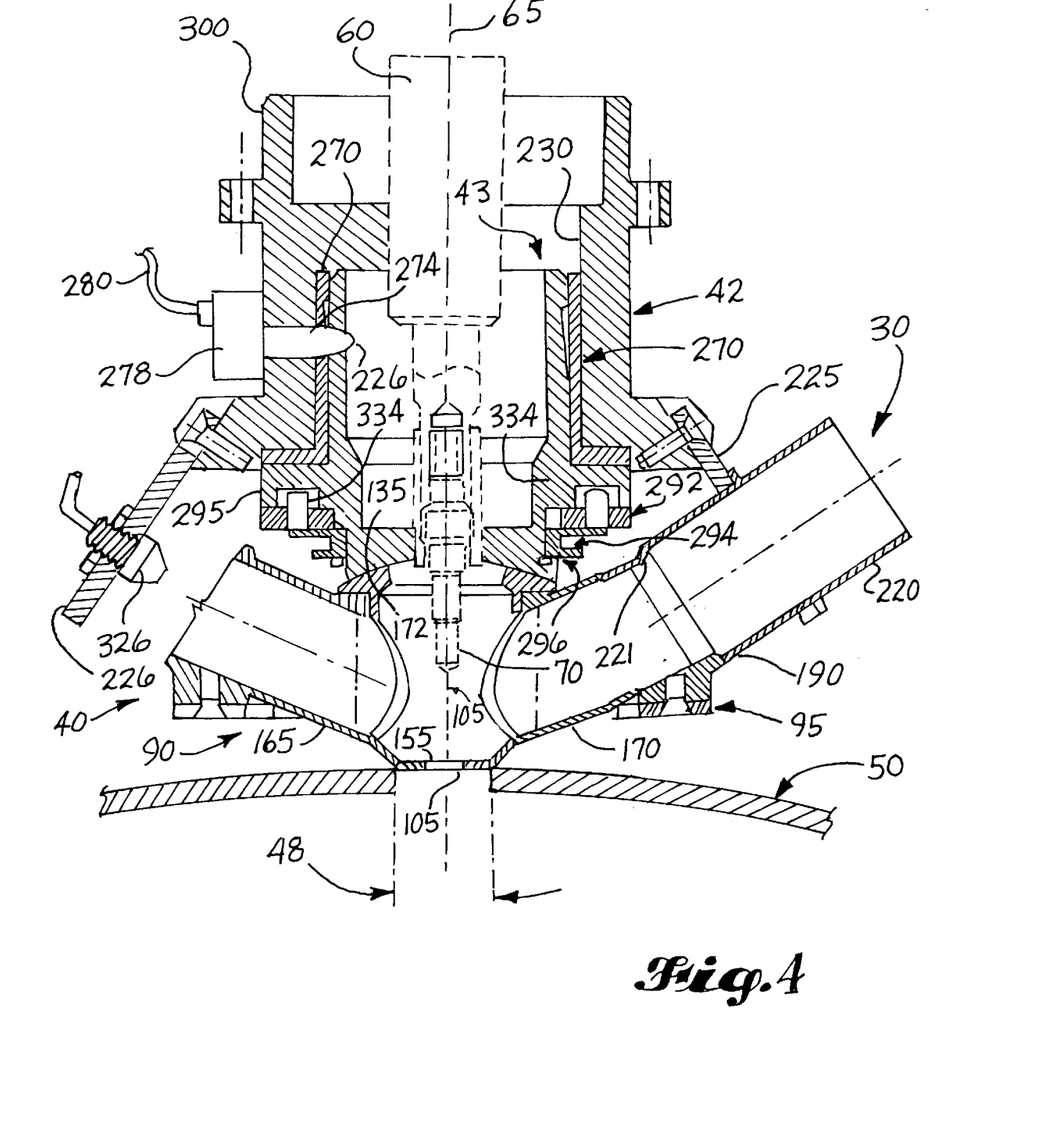
FIG. 4 is a section view of the compliant drill head taken at the first plane.

As shown in FIGS. 3, and 5–7, the vacuum housing 90 has a body 156 with a cylindrical wall 160 having two opposed side ports 162 and 164. The inner diameter of the vacuum housing cylindrical inner wall 160 closely matches the outer diameter of the pressure foot cylindrical outer wall 100, so that the inner 160 wall of the body 156 can receive the foot core 85 with a press fit. The ports 115 and 120 in the foot core are sized and positioned to align with the ports 162 and 164 in the body 156, and provide air passages through which the central chamber 110 communicates with a vacuum air discharge duct 170 and a vacuum air intake duct 165. A top annular surface 180 of the vacuum housing body 156 engages the flat under surface 140 of foot core cap 130 and presses the spherical surface 135 of the cap against a concave spherical surface 172 at the bottom end of the socket mount 43 under the tensile force of springs 174. The vacuum air intake duct 165 and the vacuum air discharge duct 170 are welded to or integral with the body 156 around the edges of the ports 162 and 164. The vacuum air discharge duct 170 has a spherical adapter surface 190 at its discharge end that is defined by a sphere having its center at a reference point that coincides with the center point 155 when compliant drill head 20 is fully assembled as shown in FIG. 4. As shown in FIG. 3, the measuring ring 95 is a substantially flat annular plate that is secured to the vacuum housing 90 at two bosses 215 and 210 on vacuum air intake duct 165 and on vacuum air discharge duct 170 by conical head screws (not shown) that engage threaded holes in the bosses 210 and 215.

Two brackets 225 and 226, shown in FIG. 4, are mounted on opposite sides of the adapter casing 42 and a vacuum adapter duct 220 is mounted to the bracket 225 in communication with the annular adapter surface 190 of the vacuum discharge duct 170. The vacuum adapter duct 220 has a lower open end with a spherical surface 222 that has the same center of curvature as the annular adapter surface 190 of the vacuum discharge duct 170, so that tilting of the pressure foot 40 about the center point 155 allows the annular adapter surface 190 of the vacuum discharge duct 170 to tilt about the center point 155 while remaining in contact and in pneumatic communication with the lower spherical surface 222 of the vacuum adapter duct 220. A vacuum hose 224, shown in FIG. 1, is connected at its lower end to the upper end of the vacuum adapter duct 220, and is connected at its upper end to a vacuum coupling 228 which mates with the coupling on the control arm 34 for suction of the drill chips. The large cross section of the intake and discharge ducts 165 and 170 ensures that the vacuum source coupled to the coupling 228 will generate a sufficient air flow through the chamber 110 to entrain and carry away the drill chips produced by drilling.

An upstanding upper lip 300 at the upper end of the adapter casing 42 fits into a cylindrical opening in the bottom of the drilling device 25 as shown in dotted lines in FIG. 1, and fasteners 302 extending through holes 304 in a peripheral flange 306 secure the adapter casing 42 to the drilling device 25. The adapter casing 42, shown in FIG. 3, has an open cylindrical through bore 230 into which a wear sleeve 270 is received with a snug fit and which in turn receives a tubular extension 272 of the socket mount 43. As shown in FIG. 4, the wear sleeve 270 and the mounting socket 43 are releasably retained in the bore 230 of the adapter casing by a spring loaded locking pin 274 having a conical tip 276 extending through aligned holes in the adapter casing 42, the wear sleeve 270, and the tubular extension 272. The pin 274 may be retracted by a pneumatic cylinder 278 using pressurized air delivered via an air line 280, which allows the socket mount 43 and the entire compliant drill head 20 to drop out of the bore 230 in the adaptor casing 42.

A cylindrical recess 315 opening in the bottom of the adapter casing 42 receives a bottom radial flange 320 of the wear sleeve 270 and the wear sleeve is trapped in the bore 230 by the flange 295 of the socket mount 43. A lower radial flange 325, shown in FIG. 3, on the lower end of the adapter casing is beveled at 316 and is drilled and tapped to receive a fastener 330 to secure the vacuum adapter duct bracket 225 to the bevel 316 on the flange 325. As shown in FIG. 4, another bracket 226 attached to the diametrically opposite side of the flange 325 in the same way supports a nozzle 326 for dispensing a spray of mist lubrication into the air stream flowing into the vacuum air intake duct 165 of the vacuum housing 90 as the drill bit 70 is approaching the workpiece surface 50 to apply a small amount of lubricant to the drill bit.

The tubular extension 272 of the socket mount 43 extends upwardly from a radial flange 295 adjacent the bottom of the socket mount 43 and terminates in a beveled, undercut lip 318 which facilitates the insertion of the tubular extension 272 into the wear sleeve 270. A bottom web 332 across the bottom end of the socket mount 43 has an axial opening 338 through which the lower end of the spindle 46 and the quick change chuck 47 extend for drilling holes in the workpiece surface 50. The axial hole 338 can serve as a journal bearing to minimize the normal runout of the drill spindle 46. The under surface of the bottom web 332 is the concave spherical bearing surface 172 against which the spherical surface 135 of the cap slides. The radial flange 295 is enlarged on opposite radial sides into wings 291 as shown in FIG. 6 into which holes 297 and 299 are drilled for receiving pins of an end effector rack when the drill head 20 or the entire drilling device 10 is to be put down so the robot 36 can pick up another end effector.

A retaining ring 296 snaps into a groove 298 in the mounting socket 43 below the flange 295 and holds an anti-rotation ring 292 and a spring anchor collar 294 in position around the base of the socket mount 43 against the underside of the flange 295. The inner diameter of the anti-rotation ring is larger than the outer diameter of the bottom web 332, providing a small degree of radial play of the anti-rotation ring on the bottom web 332 relative to the socket mount 43 and the spring anchor collar 294. A pair of pins 334 pressed into holes 336 in the anti-rotation ring 292 extend upward unto slots 340 opening in the underside of the flange 295 to allow limited lateral movement of the anti-rotation ring 292 in the plane of FIGS. 3 and 4, but prevent rotation or lateral movement of the anti-rotation ring relative to the socket mount 43 out of the plane of FIGS. 3 and 4.

The inner diameter of the spring anchor collar 294 corresponds to the outer diameter of the bottom web 332. A wide top flange 342 on the spring anchor collar 294 supports the anti-rotation ring 292 for its limited sliding motion under the flange 295. A smaller bottom flange 344 on the spring anchor collar 294, spaced below the top flange 342, is drilled in four places spaced at equal angular positions around the flange 344 to receive hooks of the upper ends of four tension springs 346, shown in FIGS. 5 and 7. The hooks on the lower ends of the tension springs 346 are engaged in eye holes drilled in an upstanding inner peripheral flange 350 surrounding a large central opening 348 in the measuring ring 95 whereby the measuring ring and the attached vacuum housing 90 and pressure foot core 85 of the pressure foot 40 are resiliently supported from the spring anchor collar 294.

Figure 6:
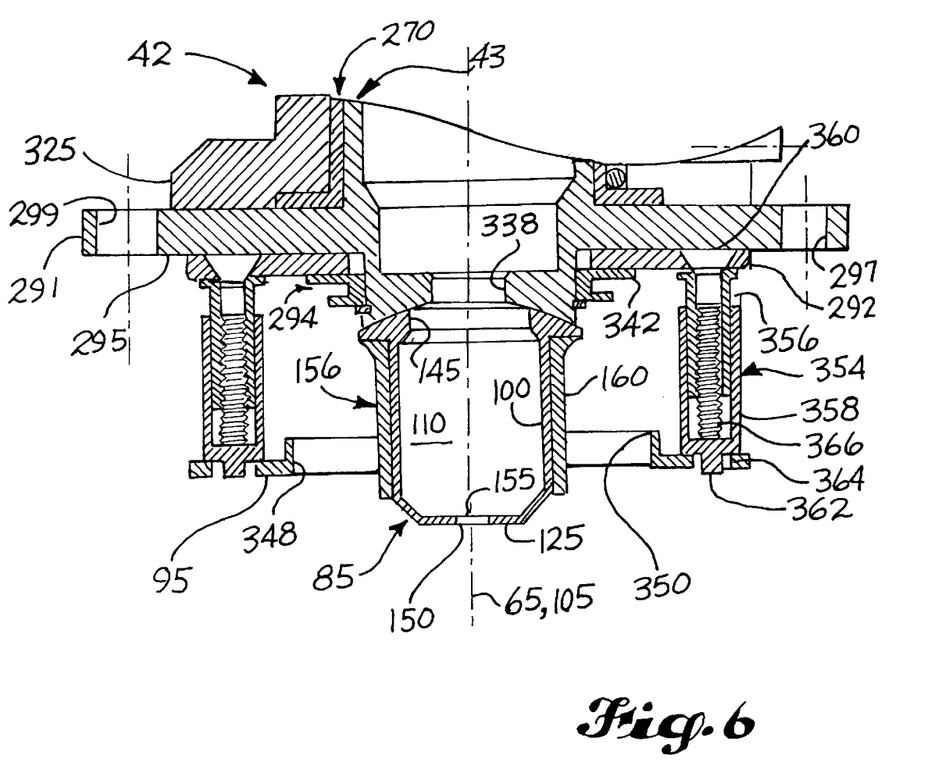
FIG. 6 is a section view of the lower portion of the compliant drill head taken at a third plane.

As shown in FIG. 6, two anti-rotation pins 354 extend between the anti-rotation ring 292 and the measuring ring 95 to hold the pressure foot 40 against rotating relative to the socket mount 43. The anti-rotation pins 354 each have an inner sleeve 356 which telescopes with a close sliding fit into an outer sleeve 358. The top of the inner sleeve 356 has a radial flange which engages the underside of the anti-rotation ring 292 when the inner sleeve 356 is drawn up tight against the anti-rotation ring 292 by a conical headed machine screw 360 which extends down through a countersunk hole in the anti-rotation ring 292 and is threaded into the top of the inner sleeve 356 which is internally threaded to receive the machine screw 360, thereby making each inner sleeve 356 a rigid post depending from the anti-rotation ring 292. Each outer sleeve 358 has a flat bottom from which a boss 362 projects downwardly into a radial slot 364 in the measuring ring 95. The bosses 362 and the slots 364 constitute coupling connections between the anti-rotation pins 354 and the measuring ring 95 as described below.

A helical compression spring 366 in each inner sleeve 354 is compressed between the bottom of the outer sleeve 358 and the end of the machine screw 360 to bias the outer sleeves 358 down against the measuring ring 95 to maintain the bosses 362 in the slots 364. When the contact surface 125 of the pressure foot core contacts a tilted workpiece and tilts to lie flat against it, the bosses 362 slide relative to the slots 364 and remain engaged therein despite the foreshortening of vertical projection of the measuring ring 95 as it tilts. The pressure foot 40 is thus able to rock from side to side relative to socket mount 43 while the bosses 362 remain engaged with the walls of the slots 364, thereby restraining pressure foot 40 from rotating about the pressure foot axis 105 relative to the adapter casing 42.

As best shown in FIG. 7, when the pressure foot 40 tilts about the center point 155, the center point of the measuring ring 95 translates slightly away from the direction of tilt. For example, in FIG. 7 the pressure foot has tilted about 50 in a clockwise direction and the center of the measuring ring has translated slightly to the right. This translation is a consequence of the elevated position of the plane of the measuring ring 95 above the plane of the contact surface 125 on which the center point 155 lies. Such translation is accommodated in the plane of FIG. 6 by the coupling connection between the lower end of the anti-rotation pins 354 and the measuring ring 95, namely, the slots 364 in the measuring ring 95 which allow the measuring ring to translate relative to the bosses 362 on the anti-rotation pins while restraining rotation of the measuring ring 95 about the pressure foot axis 105. In the orthogonal plane of FIG. 4, such translation is accommodated by the limited freedom of motion of the anti-rotation ring 292 to move laterally and carry the anti-rotation pins 354 laterally with it.

Figure 5:
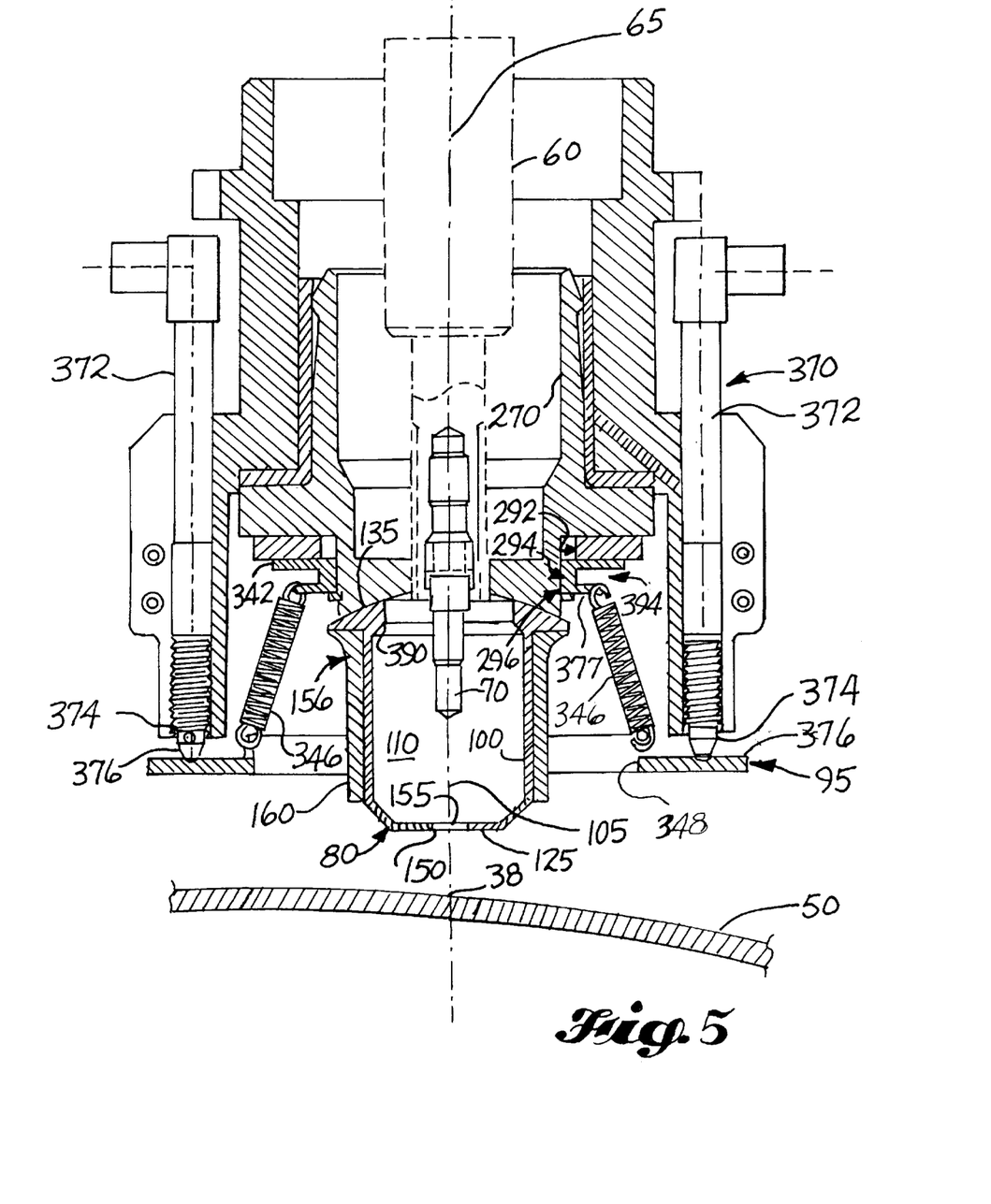
FIG. 5 is a section view of the compliant drill head taken at a second plane.

Linear measuring gauges 370, shown in FIGS. 5 and 7, detect the angle of the measuring ring 95 and generate signals representative of that angle for use by the controller 35 to tilt the drilling device 25 on a vector that will align the axis 65 of the drilling device with the axis 105 of the pressure foot so the hole drilled by the drill bit 70 will be normal to the plane of the workpiece in the region 48 of the hole. Normally there will be at least three such gauges 370, but four could also be used for more reliable performance. The measuring gauges 370 are mounted on the flange 325 of the adapter casing 42 and extend down therefrom to an elevation spaced above the maximum tilted position of the measuring ring 95, as shown for the left hand gauge in FIG. 7. Each linear measuring gauge 370 has a guide sleeve 372 and a measuring rod 374, spring biased for sliding motion in the guide sleeve 372, terminating in a probe tip 376 that is in contact with the measuring ring 95. Suitable measuring gauges for this purpose are made by Magnescale and designated as model DG-810L.

The probe tips 376 are shown in FIG. 5 in a neutral position corresponding to an alignment of the pressure foot axis 105 and the drill axis 65. When the pressure foot core contact surface 125 contacts the workpiece surface 50 and tilts to lie flat thereagainst, the downward extension of one probe tip 376 and the upward retraction of the other probe tip 376 causes the linear measuring gauges 370 to generate signals corresponding to the distance between a neutral probe end position and a displaced position caused by tilting of the pressure foot 40 and its measuring ring 95 relative to the adapter casing 42. In the preferred embodiment, four linear measuring gauges are employed to continuously provide signals that correspond to the orientation of the measuring ring 95 and pressure foot 40 relative to the drill axis 65. Two opposite pairs of linear measuring gauges are positioned so that one of each of the pairs is opposite the other of each of the pairs through the drill axis 65. The relative displacements of opposite probe ends are used to calculate the deviation of the pressure foot axis 105 relative to the drill axis 65.

In the preferred embodiment, the pressure foot 40 is mounted onto the socket mount so that the spherical upper surface 135 of the foot core cap 130 seats into the corresponding spherical bearing surface 172 at the lower end of the socket mount 43. Because the pressure foot 40 is in spherical contact with the socket mount 43 and both the concave spherical bearing surface 172 and convex spherical upper surface 135 of the pressure foot core cap 130 are defined by spheres having a common center and radius about contact point 155, the pressure foot 40 can swivel in any direction about the contact point 155 with respect to the socket mount 43. In this way, a universally swiveling joint is formed between the pressure foot 40 and the socket mount 43. In the preferred embodiment, the tension springs 346 should exert sufficient force to counteract the force exerted by the measuring rods 374 and the anti-rotation pins 354 and also the weight of the pressure foot 40 to retain the pressure foot 40 against the spherical bearing surface 172 This balancing of forces allows the pressure foot 40 to swivel freely on the bearing surface 172.

The operation of compliant drill head will now be described with reference to FIGS. 5. and 7. The compliant drill head 20 is positioned above a workpiece surface 50 where the pressure foot axis 105 is not normal to a workpiece surface 50 at the drill point 38. As the automatic control arm 34 moves the drilling device 25 toward the drill point 38 along the drill axis 65, the flat contact surface 125 of the foot core 85 makes contact with workpiece surface 50 and swivels to lie flat against the workpiece surface 50, as shown in FIG. 7.

After initial contact between the contact surface 125 and the workpiece surface 50, the control arm 34 continues to move the drilling device 25 along the drill axis 65 while foot core 85 and pressure foot 40 swivel until, as shown in FIG. 7, the flat base 125 of the foot core 85 is tangent to the workpiece surface 50 at the drill point 38 and the contact point 155 coincides with the drill point 38. The adaptor casing 42, the socket mount 43 and the pressure foot 40 of the compliant drill head 20 are all of solid, robust construction and can withstand forces in excess of 450 pounds to enable the device to apply as much press-up force as needed to hold a stack of parts in intimate contace during drilling to prevent interlaminar burrs from being produced during drilling, and the axial position of the spherical bearing provides high load carrying capacity to avoid internal deflection during press-up. The pressure foot 40 swivels relative to the socket mount 43 and the adapter casing 42 so that the pressure foot axis 105 is generally normal to the workpiece surface 50 at the drill point 38 but is at an angle relative to the drill axis 65. The probe tips 376 of the linear gauge rods 374 have alternately extended and retracted in response to the tilted measuring ring 95 resulting in displacements that are converted into corresponding signals by the linear gauges 370. These signals are provided to the controller 35 of the control arm 34 which reacts to them by swiveling the drilling device 25 about the contact point 155 and drill point 38 until the drill axis 65 is substantially aligned with the pressure foot axis 105 and the measuring gauges 370 are no longer generating signals corresponding to a displacement of their probe ends from a neutral position. Once the drilling device 25 and the pressure foot 40 are aligned normal to the workpiece surface 50, the drill spindle drive and feed motors can advance and rotate the drill spindle 46 and drill bit 70 to drill a hole that is normal to the workpiece surface 50 at the drill point 38. After the drilling operation is complete, the drilling device 25 retracts the drill spindle 46 and the control arm 34 then can move the drilling device 25 to a next drilling location where the above described steps can be repeated. In the preferred embodiment, drilling device 25 can be controlled and calibrated so that the depth of a drilling operation in relation to the workpiece surface 50 is accurately controlled thus making it possible to drill holes with very precise countersink features.

Referring back to FIG. 4, a vacuum adapter duct 220 is shown in communication with vacuum air discharge duct 170. As noted above, vacuum air discharge duct 170 has an annular adapter surface 190 at its discharge end that is defined by a sphere having a center at contact point 155. Vacuum air adapter duct 220 is in pneumatic communication with a vacuum means (not shown) and has a cooperating spherical adapter surface 221 also defined by a sphere having a center at contact point 155. This arrangement allows vacuum air discharge duct 170 to maintain pneumatic communication with vacuum air adapter duct 220 during the above described drilling operation and yet permits the two annular spherical surfaces to slide relative to each other while pressure foot 42 rotates relative to drill housing 40. Once the above described drilling operation has begun, the vacuum means can be employed to remove drill chips by drawing an air stream in through the vacuum air inlet duct 165, across the workpiece surface 50 and out through the vacuum air discharge duct 170 and vacuum air adapter duct 220.

The operation of the improved drilling device will now be summarized.
(1) The drilling device 25 having the compliant drill head 20 is placed in a neutral position so that the pressure foot axis aligns with the drill axis.
(2) The spring biased linear gauges provide data corresponding to the alignment of the pressure foot axis with the drill axis.
(3) The control arm 34 moves the drilling device 25 having the compliant drill head 20 toward the workpiece at a drill point 38 where neither the drill axis nor the pressure foot axis is normal to the workpiece surface.
(4) The pressure foot 40 of the compliant drill head contacts the workpiece and swivels relative to the adapter casing 42 to lie flat against the workpiece surface 50 until the contact point 155 substantially coincides with the drill point 38.
(5) The measuring ring 95 correspondingly tilts as the pressure foot swivels relative to the adapter mount.
(6) The probe ends of the linear gauges extend and retract in response to the tilting motion of the measuring ring and produce signals that quantifies the degree to which they have extended or retracted, representing the orientation of the measuring ring 95.
(7) The control arm responds to the signals from the linear gauges by tilting the drill housing about the contact point so that the linear gauges again produce signals corresponding to the alignment of drill axis with the pressure foot axis.
(8) The drill drive and feed motors rotate and advance the drill bit out through the adapter mount and the pressure foot and toward and through the workpiece by a controlled travel thereby producing a hole normal to the workpiece surface having precisely controlled features.
(9) After drilling the hole, the drill feed motor retracts the drill spindle, withdrawing the drill bit from the newly drilled hole.
(10) The control arm retracts the improved drilling device along the drill axis and moves the improved drilling device to a next drill point.

During step (4) above, as the pressure foot swivels to lie flat against the workpiece, it rotates about a point that is substantially at the center of the sphere defining the bearing surfaces 135 on the upper surface of the pressure foot, and therefore rotates without sliding across the workpiece surface thus avoiding marring the workpiece surface. The control arm can respond to the linear gauge signals either in a stepwise or continuous fashion until the drill axis are aligned and stable. Regardless of how the control arm responds to the linear gauge signals, the control arm and the drill drive means should be are coordinated so that no drilling operation begins until the drill axis and the pressure foot axis are aligned and stable. Also, to stabilize a thin, flexible workpiece, a second foot can be manipulated and located on the other side of the workpiece using prior art methods and devices known in the art.

Thus, the invention meets the objects noted above by providing a method and apparatus for drilling highly accurate holes normal to a workpiece surface. The problems associated with inaccurately drilled holes in contoured workpieces have been eliminated permitting those practicing this invention to create large, flexible contoured parts with accurately drilled and located fastener holes as well as counter sunk fastener holes having very accurate and uniform features which in turn allow for extremely uniform and aerodynamically effective countersunk fastener installations.

Obviously, numerous modifications and variations of this preferred embodiment will occur to those skilled in the art in light of this disclosure. Accordingly, it is expressly to be understood that these modifications and variations, and equivalents thereof, shall be considered to be within the spirit and scope of the invention as defined in following claims, wherein we claim:

1. A drilling device for drilling a normal hole in a workpiece surface at a drill point comprising:

a compliant drill head adapted for attachment to an attachment mount on a drilling device having a drill spindle for rotating and plunging a drill bit on a drill axis;

said compliant drill head having a pressure foot disposed about a pressure foot axis, and measuring gauges in contact with said attachment mount and said pressure foot for measuring orientation of said pressure foot in relation to said adapter casing and for providing signals corresponding to said orientation;

a swiveling joint connected between said attachment mount and said pressure foot;

said attachment mount and said pressure foot each having axial passageways for said drill spindle to advance therethrough;

whereby said pressure foot swivels relative to said adapter mount to lie flat against said workpiece surface with said pressure foot axis normal to said workpiece surface at said drill point and said drill axis of said drill housing having a misaligned orientation relative to said pressure foot axis, said compliant drill head measuring gauges providing signals corresponding to said misaligned orientation of said two axes, said control arm controller responsive to said signals by repositioning said drilling device in relation to said pressure foot to align said drill axis with said pressure foot axis so that said drill spindle can advance and rotate said drill bit toward and into said workpiece surface thereby drilling an normal hole therein.

2. A drilling device for drilling a normal hole in a workpiece surface at a drill point as defined in claim 1, wherein said pressure foot further comprises:

a cylindrical body disposed about said first drill axis and having a substantially flat base with a substantially flat lower surface on a bottom plane, a contact point on said bottom plane where said pressure foot axis intersects said bottom plane, said lower surface lying normal to said pressure foot axis;

said cylindrical body including a spherical upper surface defined by a sphere having a center at said contact point, a central chamber, an upper hole centered on said pressure foot axis communicating between said spherical upper surface and said central chamber, a lower hole centered on said first drill axis communicating between said central chamber and said lower surface.

3. A drilling device for drilling a normal hole in a workpiece surface at a drill point as defined in claim 2 wherein said attachment mount further comprises:

a lower spherical bearing surface defined by a sphere centered on said pressure foot axis having a radius substantially equal to that of said sphere defining said spherical upper surface of said pressure foot, said attachment mount also having an axial passage for said drill spindle and a hole centered on said drill axis communicating between said axial passage and said lower spherical bearing surface.

4. A drilling device for drilling a normal hole in a workpiece surface at a drill point as recited in claim 3, wherein said measuring gauges comprise:

at least three linear measuring gauges mounted to said adapter mount, each of said linear measuring gauges having a sensor for detecting positions of an upper surface of said measuring ring, each of said measuring gauges generating signals corresponding to said positions of said measuring ring.

5. A drilling device for drilling a normal hole in a workpiece surface at a drill point as defined in claim 2, wherein said drilling device further comprises:

at least three tension springs securing said pressure foot against said attachment mount, whereby said pressure foot spherical upper surface is in swivelable contact with said attachment mount lower spherical bearing surface.

6. A drilling device for drilling a normal hole in a workpiece surface at a drill point as defined in claim 2, further comprising:

a substantially flat measuring ring fastened rigidly to said pressure foot and extending radially about said cylindrical body;

said measuring ring lying in a plane normal to said pressure foot axis and spaced above said bottom plane.

7. A drilling device for drilling a normal hole in a workpiece surface at a drill point as defined in claim 6, further comprising:

an anti-rotation ring attached to said attachment mount by guides which permit limited lateral movement in one lateral direction in a plane normal to said drill axis;

anti-rotation pins connected between said anti-rotation ring and said measuring ring for preventing rotation of said measuring ring about said pressure foot axis;

said anti-rotation pins extending rigidly from said anti-rotation ring and having telescoping portions movable parallel to said drill axis to follow a component of tilting motion of said measuring ring parallel to said drill axis, said telescoping portions coupled to said measuring ring by coupling connections that enable said measuring ring to move laterally relative to said anti-rotation pins as said a projection of said measuring ring parallel to said drill axis foreshortens when said measuring ring tilts about an axis parallel to said one lateral direction.

8. A drilling device for drilling a normal hole in a workpiece surface at a drill point as defined in claim 7, wherein:

said coupling connections include bosses on the lower ends of said anti-rotation pins, and slots in said measuring ring into which said bosses extend.

9. A drilling device for drilling a normal hole in a workpiece surface at a drill point as defined in claim 7, wherein:

said guides include pins fixed in said anti-rotation ring and projecting therefrom into slots in said adapter mount.

10. A drilling device for drilling a normal hole in a workpiece surface at a drill point as defined in claim 7, wherein:

said coupling connections include bosses on the lower ends of said anti-rotation pins, and slots in said measuring ring into which said bosses extend; and said guides include pins fixed in said anti-rotation ring and projecting therefrom into slots in said adapter mount;

said slots in said measuring ring each having a direction of elongation extending along a first line in the plane of said measuring ring and lying perpendicular to said pressure foot axis, and said slots in said adapter mount each having a direction of elongation extending on a second line lying perpendicular to both said drill axis and said first line.

11. A drilling device for drilling a normal hole in a workpiece surface at a drill point as defined in claim 1, wherein:

said adapter mount includes an adapter casing rigidly fastened to said drilling device and a socket mount releasably held in said adapter casing, said adapter casing having an axial bore sized to receive a tubular extension of said socket mount, said socket mount being releasably held in said adapter casing by a releasable connector.

12. A drilling device for drilling a normal hole in a workpiece surface at a drill point as defined in claim 11, wherein:

said releasable connector includes a pin mounted on said adapter casing in alignment with a hole therein and coupled to a pneumatic cylinder for extension through said adapter casing hole into an aligned hole in said tubular extension of said socket mount to hold said socket mount in said adapter casing until said pin is withdrawn by said pneumatic cylinder.

13. A drilling device for drilling a hole in a workpiece surface at a drilling point, comprising:

a compliant drill head having a pressure foot swivelably mounted against an adapter mount, said pressure foot having a cylindrical body enclosing a central chamber disposed about a pressure foot axis and having a substantially flat lower surface on a bottom plane;

a contact point on said bottom plane where said pressure foot axis intersects said bottom plane, said pressure foot axis lying substantially normal to said bottom plane;

a substantially spherical upper surface on said cylindrical body defined by a sphere having a center at said contact point;

an upper hole centered on said pressure foot axis communicating between said spherical upper surface and said central chamber, and a second hole centered on said first drill axis communicating between said central chamber and said flat lower surface;

a substantially flat measuring ring fastened to and extending radially around said cylindrical body, said adapter mount having a lower spherical bearing surface defined by a sphere centered on a drill axis and having a center of curvature substantially coinciding with that of said sphere defining said spherical upper surface of said pressure foot, said adapter mount also having an axial hole centered on said drill axis and communicating with said lower spherical bearing surface, a drill spindle enclosed within said adapter mount and driven by a drill and feed motors in said drilling device for advancing and rotating a drill bit along said drill axis, at least three tension springs securing said pressure foot against said drill housing, whereby said pressure foot spherical upper surface is in swivelable contact with said adapter mount lower spherical bearing surface, at least three measuring gauges mounted to said adapter mount, each of said measuring gauges having a sensor for measuring the distance to said measuring ring and generating signals corresponding to positions of said measuring ring relative to said adapter mount;

an automatic control arm coupled to said drilling device for supporting, moving and positioning said compliant drill head, said control arm having a controller for receiving and responding to said signals provided by said measuring gauges, whereby, when said control arm moves said compliant drill head toward an intended drill point on said workpiece surface, said pressure foot lower surface contacts said workpiece surface and swivels relative to said adapter mount as said pressure foot contacts said workpiece surface with said contact point substantially coinciding with said drill point so that
  a) said flat lower surface lies flat against said workpiece surface around said intended drill point and said pressure foot axis extends substantially normal to said workpiece surface at said drill point,
  b) said measuring ring tilts to a new orientation relative to said adapter mount as said pressure foot swivels,
  c) said measuring gauges detect said new orientation of said measuring ring relative to said adapter mount and generate signals corresponding to said new orientation;
  d) said controller reads said signals and produces commands to move said control arm to orient said drill axis of said drilling device to coincide with said pressure point axis, and
  g) said drilling device drive and feed motors advance and rotate said drill spindle and said drill bit toward said workpiece thereby drilling a hole substantially normal to said workpiece surface at said drill point.

14. A drilling device as recited in claim 13, wherein:
said pressure foot cylindrical body further has structure defining a first and second side port, said first side port communicating with a radially extending vacuum air intake duct, said second side port communicating with a radially extending vacuum air discharge duct, said vacuum air discharge duct having structure for coupling pneumatically to a vacuum system, said vacuum system drawing air in through said vacuum air intake duct, across said workpiece surface and out through said discharge duct thereby removing chips produced when said drill tool drills a hole in said workpiece.

15. A drilling device as recited in claim 14, wherein:
said vacuum air discharge duct has a discharge end having a spherical adapter surface, said adapter surface defined by a sphere having its center at said contact point, said drill housing having a vacuum adapter duct mounted thereto, said vacuum adapter duct having an adapter surface corresponding to said vacuum air discharge duct adapter surface, said adapter duct connected to said vacuum means, said vacuum adapter duct and said vacuum air discharge duct capable of sliding relative to each other while said pressure foot swivels relative to said drill housing, said vacuum air discharge duct maintaining pneumatic communication with said vacuum adapter duct while said drill tool drills a hole in said workpiece.

16. A method for drilling a normal hole in a workpiece surface comprising:
  (1) providing control arm on which is mounted a drilling device having drill drive and feed motors for advancing and rotating a drill spindle, said drilling device having a compliant drill head with a pressure foot, an adapter casing through which said compliant drill head is attached to said drilling device, and measuring gauges extending between said adapter casing and said pressure foot, said pressure foot being disposed about a pressure foot axis and said drill spindle being disposed about a drill axis, said pressure foot having a flat lower surface centered on a contact point on said pressure foot axis, said pressure foot being in swivelable contact with said drill adapter casing, said pressure foot and said adapter casing having axial chambers for enclosing said drill spindle for advancing and rotating a drill bit held to said spindle toward and into said workpiece surface, said adapter casing and said pressure foot having a neutral position wherein said pressure foot axis is aligned with said drill axis;
  (2) generating signals in said measuring gauges corresponding to the degree of alignment of said drill axis and said pressure foot axis,
  (3) moving compliant drill head on said drilling device into contact with said workpiece at a drill point,
  (4) pressing said pressure foot of said compliant drill head against said workpiece and causing said pressure foot to swivel relative to said adapter casing as said pressure foot lies flat against said workpiece surface,
  (5) transmitting signals from said measuring gauges to a controller of said control arm in response to swiveling motion of said pressure foot as it swivels relative to said adapter casing;
  (6) moving said control arm in response to said signals by rotating said drilling device about said contact point so that said measuring gauges produce signals corresponding to alignment of said drill axis with said pressure foot axis, (7) rotating and advancing said spindle and said drill bit into said workpiece by a controlled travel thereby producing a hole normal to the workpiece surface having precisely controlled features and (9) retracting said spindle along said drill axis and moving drilling device to a next drill point.

17. A method of drilling a hole in a surface of a workpiece on an axis normal to said workpiece surface, comprising:

supporting a drilling device, having a drilling axis, on an automatic control arm and positioning said drilling device above a workpiece surface;

swivelably holding a pressure foot on said drilling device for universal swiveling motion on said drilling device, said pressure foot having a bottom surface on a flat plane and an opening therethrough, said pressure foot having an axis extending through said opening and normal to said flat plane, said pressure foot axis intersecting said flat plaane at a contact point and coinciding with said drilling axis when said pressure foot is oriented normal to said drilling axis, and intersecting said drilling axis at said flat plane at said contact point when said pressure foot is oriented at an angle other than normal to said drilling axis;

moving said drilling device with said automatic control arm toward said workpiece surface to bring a pressure foot, swivelably mounted on a compliant drill head connected to said drilling device, into contact with said workpiece surface;

swiveling said pressure foot on said compliant drill head about said contact point to lie flat against said workpiece surface;

measuring the angle of said pressure foot with said pressure foot lying flat against said workpiece surface, using gauges that produce signals indicative of said pressure foot angle;

transmitting said signals to a controller of said control arm, said controller processing said signals and producing correction signals to said control arm to move said control arm in an arc about said contact point to a position at which said drilling axis is normal to said workpiece surface; and advancing and rotating a drill bit into said workpiece surface to drill said hole normal to said workpiece surface.

18. A method of drilling a hole in a surface of a workpiece as defined in claim 17, further comprising:

calibrating said controller to stop advancing said drill tool into said workpiece at a preselected depth;

whereby depth of drilling operations in relation to said workpiece surface may be accurately controlled, thus facilitating the drilling of holes with very precise countersink features.

19. A method of drilling a hole in a surface of a workpiece as defined in claim 17, wherein:

said swivelable holding of said pressure foot against said compliant drill head includes resiliently pressing a spherical bearing surface of said pressure foot in an axial direction into a spherical socket on said compliant drill head and extending said drill spindle through an axial opening in said socket and said spherical bearing.

20. A method of drilling a hole in a surface of a workpiece as defined in claim 19, wherein:

said spherical socket is in a lower surface of a socket mount having a tubular extension received in a bore of an adapter casing rigidly connected to said drilling device, and said spherical socket is on an upper surface of said pressure foot; said method further comprising:

disconnecting and releasing said compliant drill head from said drilling device by withdrawing a locking pin extending through aligned holes in said adapter casing and said tubular extension of a socket mount allowing said socket mount to drop out of said bore in said adaptor casing.

* * * * *